United States Patent [19]
Ford

[11] 3,746,987
[45] July 17, 1973

[54] DEVICE FOR MEASURING THE SPEED OF A ROTATING SHAFT

[75] Inventor: Eric Harold Ford, London, W. 8, England

[73] Assignee: Lumenition Limited, London, England

[22] Filed: Nov. 15, 1971

[21] Appl. No.: 198,521

[30] Foreign Application Priority Data
Nov. 20, 1970 Great Britain .................. 55,405/70

[52] U.S. Cl. .................... 324/167, 324/175, 73/518
[51] Int. Cl. ................................................ G01p 3/48
[58] Field of Search .......................... 324/167, 175; 310/166, 268; 318/160, 696; 73/518–520; 235/92 DN

[56] References Cited
UNITED STATES PATENTS
3,309,609 3/1967 Brewer............................ 324/167
3,456,187 7/1964 Schmidt........................... 324/167
3,247,433 4/1966 Lasch............................... 318/696

Primary Examiner—Michael J. Lynch
Attorney—Roberts B. Larson, William R. Hinds et al.

[57] ABSTRACT

A device for measuring the angular speed of rotation of a shaft in which a voltage pulse is obtained by chopping a source of infra-red radiation in synchronism with the rotation of the shaft, amplifying, fast switching and dividing the voltage pulses thus obtained so as to generate a rotating field which acts on an electrically conducting disc to cause an angular displacement thereof, the displacement being proportional to the speed of rotation of the shaft.

3 Claims, 4 Drawing Figures

DEVICE FOR MEASURING THE SPEED OF A ROTATING SHAFT

The present invention relates to a device for measuring the angular speed of a rotating shaft, and in particular the speed of a road vehicle.

The conventional way of measuring vehicle speed is to connect a cable, by means of gears, between the final drive from the gearbox to a speedometer of conventinal form. This conventional way suffers from the disadvantage that it is a mechanical connection and thus is subject to wear and ultimate failure. Moreover due to the inertia of the meter, the pointer will not accurately follow sudden fluctuations in speed, since if it is overdamped its response will be sluggish and if it is underdamped its response will cause overshooting and oscillation of the pointer.

It is therefore an object of the invention to overcome partially or wholly the above mentioned disadvantages.

According to the present invention there is provided a device for measuring the angular speed of a rotating shaft, including means for providing a plurality of voltage outputs generated in timed sequence with the speed of rotation of the shaft, means for generating a rotating field by means of the sequential plurality of voltage outputs, and means for measuring the torque generated by this rotating field so as to provide a measurement of the speed of rotation of the shaft.

Preferably the device includes three electromagnets arranged in an equilateral triangle with their end faces forming equal air-gaps with an electrically conducting disc mounted on a shaft and biased against rotation by means of a hair spring.

The device may also incorporate an inverse switching current amplifier designed to switch at a fast rate.

The present invention will now be described in greater detail by way of example with reference to the accompanying drawings, wherein.

Figure 1:
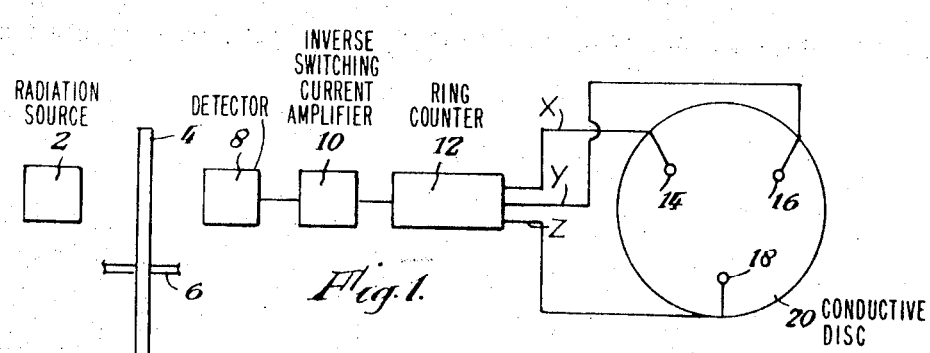
FIG. 1 is a schematic block diagram of one preferred form of device for measuring the speed of a road vehicle.

Referring to the drawings, the device includes a source of electro-magnetic radiation 2 which is preferably a gallium arsenide lamp emitting radiation in the infra-red region of the electro-magnetic spectrum; a radiation chopper 4 mounted on a shaft 6 driven in synchronism with the final drive from the gearbox; an electro-magnetic radiation detector 8, which is preferably a photo-transistor or a photo-darlington pair; an inverse switching current amplifier 10; a ring counter 12 including three transistors which are switched in sequence to produce three outputs X, Y and Z; three electro-magnets 14, 16 and 18, energized from the respective outputs X, Y and Z; and a speedometer operated by means of the rotating field produced by the three electro-magnets.

Figure 4:
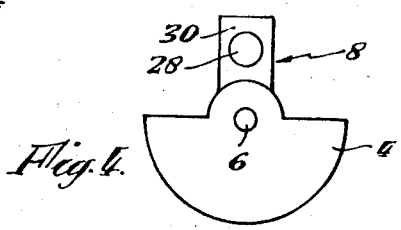
FIG. 4 is a front view of one preferred form of radiation chopper.

Referring to FIG. 4, one preferred form of chopper 4 is shaped substantially semicircular so as to provide an ON/OFF mark space ratio of unity for the infra-red radiation reaching the photo-transistor 8. The photo-transistor 8 is mounted on a fixed arm 30 which is provided with a lens 28 so as to concentrate the radiation onto the p-n junction of the transistor 8. It will be appreciated that the ON/OFF mark space ratio of the radiation reaching the photo-transistor 8 may be of any other value.

Figure 2:
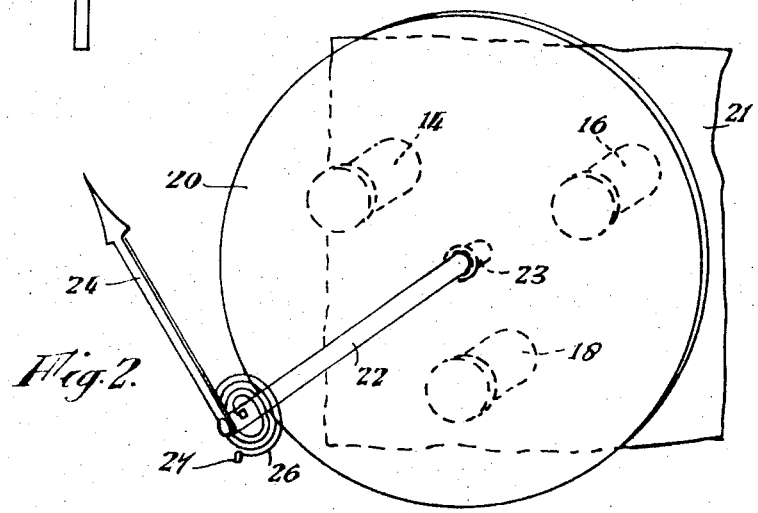
FIG. 2 is a diagrammatic perspective view of that part of the device which indicates the speed.

Referring to FIG. 2 the three electro-magnets 14, 16 and 18 are mounted on the frame of the speedometer so as to form an equilateral triangle. An electrically conductive disc 20 (e.g., copper) is mounted on a shaft 22 to rotate in a bearing 23 mounted on the rear plate 21 of the instrument. The shaft 22 passes through the centre of the equilateral triangular arrangement of the electro-magnets and the copper disc 20 is mounted on the shaft so that one face defines a narrow air-gap with the end faces of the electro-magnets which all have the same magnetic polarity, e.g., north. A pointer 24 is fixed to the shaft and arranged to move over a scale (not shown). One end of a hair spring 26 is attached to the shaft 22 whilst the other end 27 is secured to the framework (not shown) of the instrument. The hair spring 26 biases the pointer to the zero position on the scale in the absence of any rotating field produced by the electro-magnets.

Figure 3:
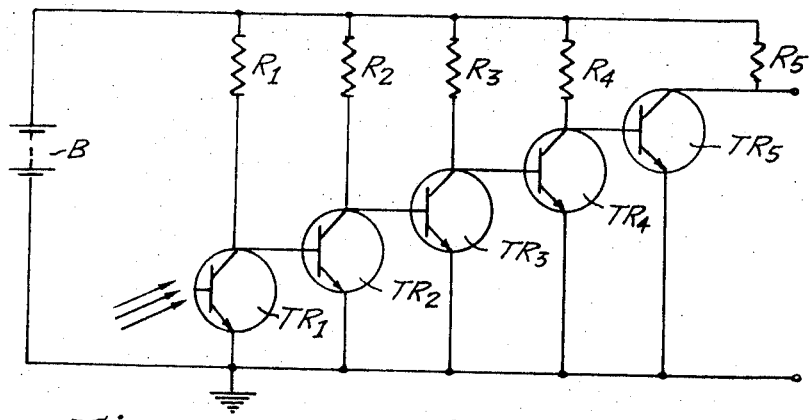
FIG. 3 is a circuit diagram of a preferred form of an inverse switching current amplifier used with the device.

Referring now to FIG. 3, one preferred form of the inverse switching current amplifier is shown in greater detail. This amplifier is shown as including a phototransistor TR1 which forms the electro-magnetic radiation detector 8 of FIG. 1. The photo-transistor TR1 has a resistor R1 in the collector path thereof. The amplifier proper includes four NPN silicon transistors TR2, TR3, TR4 and TR5 connected in cascade from the photo-transistor TR1 such that the collector electrode of one transistor is connected to the base electrode of the next following transistor. All the transistors TR1 to TR5 have their emitter electrodes connected to earth or the negative side of a battery B, whilst the collector electrodes are connected to the positive side of the battery through respective resistors R1 to R5.

Each of the transistors TR2 to TR5 which make up the fast inverse switching current amplifier works in the opposite mode to its neighbours. If it is "on" its neighbours are "off" and vice versa. The principle of this amplifier is based upon the fact that a transistor which has a high base current relative to its collector current will have a low voltage drop across its collector/emitter terminals, low enough to be below the turn "on" base/emitter voltage of a similar transistor. Thus every transistor is either completely non-conducting or fully saturated.

Each stage of the amplifier is designed to amplify the current by inverse switching thereof by a factor of five. If the current through the photo-transistor TR1 is approximately 1.6μA, then this is amplified by the successive stages TR2, TR3, TR4 and TR5 8μA, 40μA, 0.2mA and 1mA respectively. The output terminal which is connected to the collector electrode of the last transistor TR5 of the amplifier is thus switched from a high voltage nearly battery terminal voltage when the transistor TR5 is not conducting to a low voltage or nearly zero voltage when the transistor is "on." The output is thus a square wave voltage of approximately equal mark space ratio when the radiation chopper 4 is that as shown in FIG. 4, and this voltage waveform which is accurately synchronized with the rotation of the shaft 6 due to the fast switching aspect of the amplifier, is applied to the input of the ring counter 12. The ring counter 12 is of a known type and is therefore not described further.

In operation every time the infra-red radiation is cut off the transistors TR1, TR3 and TR5 turn off, whilst the transistors TR2 and TR4 turn on. The transistor TR5 on turning off produces a "high" at the collector electrode which triggers the ring counter 12. The output from the ring counter 12 produces outputs X, Y and Z in sequence for every three interruptions of the electro-magnetic radiation by the chopper 4. These outputs are fed to the three electro-magnets 14, 16 and 18 in sequence which set up a rotating field, the strength of which is proportional to the speed of rotation of the chopper and hence the speed of the rotating shaft 6. This rotating field tends to rotate the disc 20 against the action of the hair spring 26, the torque produced being proportional to the speed, so that the scale can be calibrated to read M.P.H. in the case where the device is used to measure the speed of a road vehicle.

Instead of providing three outputs from the ring counter 12, and three electro-magnets, any number of outputs and a corresponding number of electro-magnets may be used to produce the rotating field.

The above described device for measuring the angular speed of rotating shafts and in particular the speed of a road vehicle, is less subject to mechanical failure and the response is substantially instantaneous regardless of the acceleration or deceleration of the rotating shaft.

What I claim and desire to secure by Letters Patent Is:

1. A device for measuring the angular speed of a rotating shaft including: an infra-red radiation source, a radiation detector; a radiation interrupting element positioned between said source and said detector and driven by said shaft, the element having a portion that blocks the radiation and a cut away portion which permits radiation to reach the detector, to thereby produce a plurality of square wave voltage outputs having a constant mark space ratio and being generated in timed sequence with the speed of rotation of the shaft; an inverse switching current amplifier triggered by the output of the detector; a ring counter, supplied from the output of the amplifier, for providing on three separate outputs in sequence, square wave constant mark space ratio pulses which are synchronized with the rotation of the radiation interrupting element; means for generating a rotating field from the three separate square wave outputs of the ring counter; and means for measuring the torque generated by this rotating field so as to provide a measurement of the speed of rotation of the shaft.

2. A device according to claim 1, wherein said inverse switching current amplifier has a plurality of cascaded transistor stages arranged so that they are alternately on and off or vice versa at any one instant.

3. A device according to claim 1, wherein the means for generating and measuring the rotating field includes three electro-magnets arranged in an equilateral triangle with their end faces forming equal air-gaps with an electrically conducting disc mounted on a shaft and biased against rotation by means of a hair spring.

* * * * *